April 20, 1965  F. C. WELCH  3,178,881
LINE LINKING SWIVEL
Filed Jan. 11, 1962
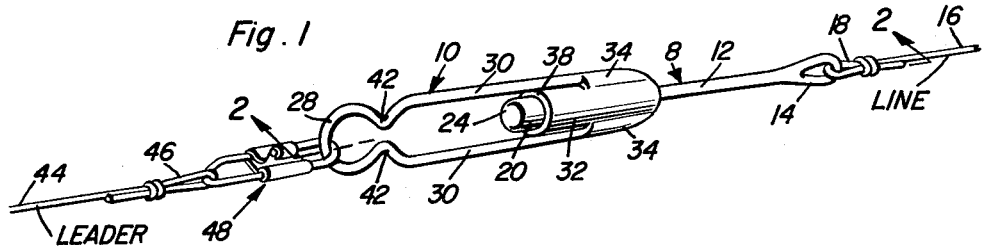
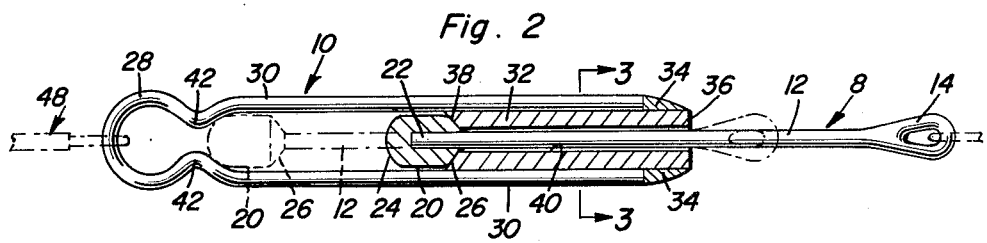
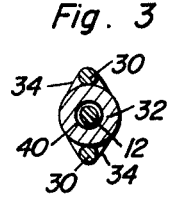 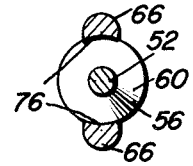
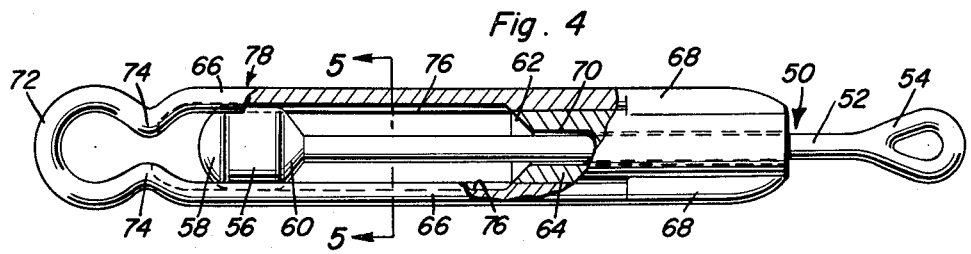
Frank C. Welch
INVENTOR.

United States Patent Office 3,178,881
Patented Apr. 20, 1965

3,178,881
LINE LINKING SWIVEL
Frank C. Welch, 1121 S. 6th St., Terre Haute, Ind.
Filed Jan. 11, 1962, Ser. No. 165,616
2 Claims. (Cl. 59—95)

This invention relates to a swivel for effectually connecting or linking a fishing line to a baited or lure-equipped leader, the latter considered with or without a leader clasp or snap fastener, and has to do, more particularly, with an improved line and leader linking swivel-type connector.

Briefly, the swivel or connector comprises a shaft connected at one end to an attachable cooperating end of a line, a tube or sleeve slidable and rotatable on the shaft, a suitable stop or head on the other end of the shaft adapted to abut the cooperating end of the sleeve, and an elongated U-shaped link (loop or yoke) for connection of tackle thereto, the limbs or arms straddling the head and sleeve and being fixed to the sleeve.

More specifically, the invention is characterized by a line, a shaft having one end fastened to the cooperating end of said line, a sleeve slidable and rotatable on said shaft, said sleeve having a bore of a cross-section slightly larger than the cross-section of the shaft, said sleeve being of a length less than the length of said shaft, said shaft having a head on its other end of a cross-section greater than the cross-section of said bore, and an elongated U-shaped yoke having spaced parallel limbs joined by a bight portion, said limbs being of a length greater than the length of said sleeve and having end portions straddling diametrically opposite sides of the head and sleeve and fixed to said sleeve, the rearward end of said sleeve being spaced forwardly from said bight portion, and said head being slidable and turnable in the space between said limbs.

An object of the invention is to provide a swivel of simple, practical and responsive construction having an elongated wire yoke or link of open construction and wherein the overall structure is of uncomplicated light weight form highly suitable for use with a light in weight monofilament line and thus expressly adapted for spinning reel casting and trolling, and which promotes positive and reliable lure action and performance in that the line is prevented from twisting.

The herein disclosed swivel is novel in that the link or yoke is open to permit free flow of water, whereby to lubricate the contacting relatively movable surfaces of the head, sleeve or bearing, and shaft, and wherein the construction and arrangement of component parts keeps the swivel lined up longitudinally with the line of flight or travel and overcoming any tendency to weave or follow an undesirable spiralling course or flight pattern that would result in line twisting tendencies.

The herein improved swivel, as will be hereinafter observed, does not rotate or bend longitudinally. The shaft slides back and forth through its bearing sleeve or tube only in the line of travel or flight and thus minimizes the tendency of the swivel describing an objectionable spiral flight pattern when trolled, thus minimizing the likelihood of line twisting. This sliding and turning function along the towing line tends to permit the swivel to align itself with the line of movement before tension is applied by the baited or lure-equipped tackle.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIGURE 1 is a view in perspective of a line linking swivel constructed in accordance with the present invention and showing the same connecting or linking a fishing line with a leader, the latter attached to said swivel by a snap-type fastener or clasp;

FIGURE 2 is a view on a larger scale with parts in section and elevation taken on the plane of the longitudinal section line 2—2 of FIGURE 1;

FIGURE 3 is a cross-section on the line 3—3 of FIGURE 2;

FIGURE 4 is a view similar to FIGURE 2 but showing a modification of the inventive concept; and FIGURE 5 is a section on the line 5—5 of FIGURE 4.

With reference first to FIGURES 1 to 3, inclusive, it will be observed that the connector or swivel as an entity is characterized by two component parts; namely, the shaft 8 and slidingly and swivelly attached link or yoke 10. These component parts are fabricated from stainless steel wire. The shaft 12 is provided at its forward or leading end with an eye which may be either stamped or drilled, said eye 14 serving to permit the line 16 to be attached thereto as at 18. The head 20 (FIG. 2) is affixed to the rearward end portion 22 of the shaft and while the head may be ball-like or spherical in configuration it is here shown as of elongated form having a convex trailing end 24 and a conical forward seating and friction-reducing end 26.

The yoke or link may be described as of elongated U-shaped form and characterized by a bight portion 28 joining the cooperating ends of the spaced parallel coplanar arms or limbs 30. These limbs have end portions straddling the head 20 and an elongated bearing sleeve 32. The sleeve is interposed between the end portions of the limbs and the terminals thereof are soldered or otherwise fixedly joined as at 34 to the end 36 of the sleeve with the terminals of the limbs and end of the sleeve being preferably flush as illustrated in FIG. 2. The trailing end 38 of the sleeve is recessed to provide a conical cavity or socket which conforms in shape and size with the contacting conical end portion of the head. The head is, manifestly, of a cross-section greater than the bore 40 of the sleeve. The bore is slightly greater in cross-section than the cross-section of the shaft to permit free relative sliding and turning of the parts. It will also be noted that the sleeve is of an appreciable length proportional to the overall length of the shaft to minimize bending and jamming. Also, the cylindrical body portion of the head is of a cross-section that the peripheral surface is in close spaced relation to the inner lengthwise surfaces of the arms or limbs 30. The limbs adjacent to the bight portion are provided with opposed inwardly directed substantially V-shaped bends or bent portions 42 which define a constricted neck and also transform the adjacent end portion of the link into a suitable attaching eye for the tackle. Then, too, these bent portions provide a limit stop which prevents the head on the shaft from traveling into the attaching eye as is brought out in dotted lines in FIG. 2. The leader 44 is attached at 46 to a snap-type leader fastener (clip or clasp) denoted at 48 which in turn is attached to the eye of the link.

The modification shown in FIGS. 4 and 5 is approximately the same in construction as that already described. This construction is designed and adapted for heavy tackle deep sea fishing. Here the shaft, which is linearly straight and rigid is denoted by the numeral 50, the shaft proper at 52 having an attaching eye 54 for the line. The head 56 has a cylindrical body portion, a convex trailing end portion 58 and a conical forward or leading end portion 60 which seats itself in the correspondingly shaped recess or socket 62 provided therefor at the corresponding end of the sleeve 64. The sleeve is interposed between the ends of the limbs or arms 66 and is soldered or fixed in place as at 68. The bore of the sleeve is denoted at 70. The bight portion 72 connects the ends of the limbs together and here again inwardly directed V-shaped bends 74 define the attaching eye and also stop shoulders for the travel of the sliding turning head. In addition to being larger in proportion and of sturdy construction this form of the invention is desirable in that the inner lengthwise surfaces of the limbs are provided with opposed spaced parallel grooves which provide tracks 76 in which the head turns and runs thus increasing resistance to bending and minimizing the binding effect in the bearing tube. The link or yoke is here designated as an entity by the numeral 78.

It will be observed that the herein disclosed line linking swivel or line and tackle connector is of the utmost simplicity in design and construction and is susceptible of low cost production. The open construction with consequent free flow of water down the shaft and through the loop serves to lubricate the contacting bearing surfaces and tends to keep the swivel lined up with the line of approach. The light weight of the overall swivel, compared with its strength, utilizing stainless steel wire for construction, minimizes the "sinker" effect of the swivel. The length of the shaft as compared with the distance from the upper or forward end of the loop to the loop terminus is designed to prevent the shaft head from colliding with the loop terminus and fouling the line or providing a braking effect in the swivel. The comparatively low transverse width of the swivel minimizes distracting effect when in use. The sleeve or bearing tube is of sufficient length to minimize bending of the shaft and the loop or link from the one line of flight in the approach through the water being fished. Further, the freedom of the shaft to slide or slip back and forth in the line of travel permits the swivel to line up with the line of travel before tension is applied, as for example, when trolling. It should be noted, too, that there are no screws or springs to complicate the construction and consequently no easy-to-wear unnecessary moving parts. Then, too, the fact that there are no wrap-around wire connections minimizes the likelihood of a rotating impeller effect on the swivel as it is drawn through the water, thus reducing line twisting tendencies. Furthermore, the construction is such that it lends itself to production in an extremely small form or larger form depending on the particular use for which the swivel is intended. The comparative length as contrasted with other swivels commercially marketed and of equal size and weight extends the swivel beyond the line and minimizes the chance of the fish biting the line rearwardly of the swivel.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, a fish line, a shaft having a forward leading end fastened to the trailing end of said line, a sleeve slidable and rotatable on said shaft, said sleeve having a bore of a cross-section slightly larger than the cross-section of the shaft, said sleeve being of a length less than the length of said shaft, said shaft having a head on its rearward end and of a cross-section greater than the cross-section of said bore, an elongated U-shaped yoke having spaced parallel limbs joined at rearward ends by a bight portion, said limbs being of a length greater than the length of said sleeve and having end portions straddling diametrically opposite sides of the head and sleeve and fixed to said sleeve, the rearward end of said sleeve being spaced rearwardly from said bight portion, said head being slidable and turnable in the space between said limbs, the body portion of said head being cylindrical in cross-section, the forward end of said head being conical, the adjacent rearward end of said sleeve having an axial conical cavity defining a socket which is adapted for removable reception of the correspondingly conical forward end of said head, said yoke being formed from a length of wire bent upon itself between its ends, said limbs adjacent to the bight portion being oppositely disposed inwardly bent portions simultaneously defining an attaching eye for a leader and a stop shoulder with which an adjacent end of said head is abuttable in a manner to check the sliding movement of the head between the arms in a direction toward said shoulder.

2. The structure defined in claim 1, and wherein the opposed inwardly disposed surfaces of the limbs between the terminal rearward end of said sleeve and said shoulder are provided with linearly straight oppositely disposed grooves, said grooves being arcuate in transverse cross-section, the cylindrical body portion of said head being conformingly slidingly and rotatably mounted in said grooves.

References Cited by the Examiner

UNITED STATES PATENTS

| 379,251 | 3/88 | Stiles | 59—95 |
| 678,676 | 7/01 | Mosier | 59—95 |
| 1,386,135 | 8/21 | Shaffer | 59—95 |
| 1,766,532 | 6/30 | Pflueger | 59—95 |
| 1,861,908 | 6/32 | Culp | 59—95 |

FOREIGN PATENTS 614,761   9/26   France.

WILLIAM J. STEPHENSON, *Primary Examiner.*

CARL W. TOULIN, CHARLES W. LANHAM,
*Examiners.*